Patented Mar. 18, 1924.

1,487,235

UNITED STATES PATENT OFFICE.

ALBERT E. HANSON AND HOWARD MOE, OF ST. PAUL, MINNESOTA.

BATTERY COMPOUND.

No Drawing.   Application filed September 9, 1922.  Serial No. 587,216.

*To all whom it may concern:*

Be it known that we, ALBERT E. HANSON and HOWARD MOE, citizens of the United States, residing at St. Paul, in the county of Ramsey and State of Minnesota, have invented certain new and useful Improvements in Battery Compounds, of which the following is a specification.

Our invention relates to compounds used in electric batteries, and the object is, to provide a battery compound having important parts of the compound in solid form so that it may be carried in a comparatively small space and readily deposited into the liquid in the battery in any desired quantity.

The dry part of our compound or composition consists of a mixture of Epsom salts, powdered alum, glycerine, hydrate of potash, and ammonium sulphate. The liquid portion is composed of distilled water and sulphuric acid.

In preparing the liquid we prefer to mix the ingredients in about the proportion of eight gallons of distilled water and about two gallons of sulphuric acid bringing a gravity test of 1.175 and into such quantity of ten gallons of liquid we deposit a cake of the solid part of the compound, which part we prefer to compose of about five pounds of Epsom salts, one-half pound of powdered alum, three gills of glycerine, four ounces of hydrate of potash, and four ounces of ammonium sulphate.

We claim;

1. A battery compound made in dry or solid form adapted to be dissolved in liquid when used in a battery, said dry compound comprising Epsom salts, powdered alum, glycerine, hydrate of potash and ammonium sulphate.

2. The compound specified in claim 1 with said ingredients in about the following proportions, five pounds of Epsom salts, one-half pound of powdered alum, three gills of glycerine, four ounces of hydrate of potash, and four ounces of ammonium sulphate.

3. The combination of the dry compound specified in claim 2 with a liquid composed of distilled water and sulphuric acid.

In testimony whereof we affix our signatures.

ALBERT E. HANSON.
HOWARD MOE.